US008169976B2

(12) United States Patent
Usuda et al.

(10) Patent No.: US 8,169,976 B2
(45) Date of Patent: May 1, 2012

(54) TRANSMISSION RATE CONTROL METHOD, MOBILE STATION, RADIO BASE STATION, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 729 days.

(21) Appl. No.: 11/507,601

(22) Filed: Aug. 22, 2006

(65) Prior Publication Data

US 2007/0066339 A1    Mar. 22, 2007

(30) Foreign Application Priority Data

Aug. 23, 2005  (JP) ................................ P2005-241877

(51) Int. Cl.
  *H04B 7/212*  (2006.01)
  *H04B 7/00*  (2006.01)
(52) U.S. Cl. .......................... 370/333; 455/522; 370/332
(58) Field of Classification Search .................. 370/332, 370/333; 455/522
  See application file for complete search history.

(56) References Cited

U.S. PATENT DOCUMENTS

| 6,021,125 | A  | * | 2/2000  | Sakoda et al. ................. 370/345 |
| 6,473,624 | B1 |   | 10/2002 | Corbett et al. |
| 6,567,670 | B1 |   | 5/2003  | Petersson |
| 2003/0204615 | A1 |   | 10/2003 | Wei et al. |
| 2003/0232622 | A1 | * | 12/2003 | Seo et al. ....................... 455/437 |
| 2005/0238053 | A1 | * | 10/2005 | Iochi et al. .................... 370/473 |

FOREIGN PATENT DOCUMENTS

TW    200406097    4/2004

OTHER PUBLICATIONS

3GPP TSG-RAN, Working Group 2 #46bis meeting R2-050907; Beijing China, Apr. 4-8, 2005; Source: NTT DoCoMo.
3GPP TS 25 309 V6 2 0: "FDD enhanced uplink; Overall doocription; Stage 2" Internet Citation, (Online) Mar. 24, 2005, XP002396227 Retrieved from the internet: URL:http://www.3gpp.org/ftp/Speco/archive/25_series/25.309/25.309/25309-620.zip>[retrieved on Aug. 24, 2006]pp. 20-29, sections 9-12.

(Continued)

*Primary Examiner* — George Eng
*Assistant Examiner* — Chayce Bibbee
(74) *Attorney, Agent, or Firm* — Marvin A. Motsenbocker; Mots Law, PLLC

(57) ABSTRACT

A transmission rate control method includes: measuring, at a radio base station, a reception power of a DPCH transmitted from the mobile station; extracting, at the radio base station, a transmission data block size of the uplink user data from an E-DPCCH; acquiring, at the radio base station, a transmission power ratio of an E-DPDCH to the DPCCH which corresponds to the extracted transmission data block size; calculating, at the radio base station, a reception power of the E-DPDCH based on the measured reception power and the acquired transmission power ratio; calculating, at the radio base station, a relative transmission rate of the uplink user data based on the calculated reception power; notifying, at the radio base station, the relative transmission rate to the mobile station via a E-RGCH; and controlling, at the mobile station, the transmission rate based on the notified relative transmission rate.

2 Claims, 15 Drawing Sheets

OTHER PUBLICATIONS

"feasibility study for enhanced uplink for UTRA FDD (Release 6) 3GPP TR 25.896" 3GPP TR 25.896 V6.0.0, Mar. 1, 2004, pp. 1-26, XP002322111 Sophia Antipolis, France pp. 17-26, entire section 7.1.
3GPP; "3GPP TS 25.309 V6.2.0 (2005-03) 3rd Generation Partnership Project: Technical Specification Group Radio Access Network: FDD Enhanced Uplink: Overall description: Stage 2 (Release 6)", pp. 1-30 (Mar. 2005) (Cited in the corresponding Taiwanese official action).
The office action of Jun. 29, 2011, issued in the counterpart Taiwanese patent application.

* cited by examiner

FIG. 18

HARQ PROFILE

| TBS | E-DPDCH TRANSMISSION POWER RATIO |
|---|---|
| 100 | 2 |
| 200 | 4 |
| 300 | 6 |
| 400 | 8 |
| ⋮ | ⋮ |

FIG. 19

HARQ PROFILE

| TBS | E-DPDCH TRANSMISSION POWER RATIO | | | |
| --- | --- | --- | --- | --- |
| | FLOW ID #1 | FLOW ID #2 | ----- | FLOW ID #N |
| 100 | 2 | 1 | | 4 |
| 200 | 4 | 2 | | 8 |
| 300 | 6 | 3 | | 12 |
| 400 | 8 | 4 | | 16 |
| ⋮ | ⋮ | ⋮ | ⋮ | ⋮ |

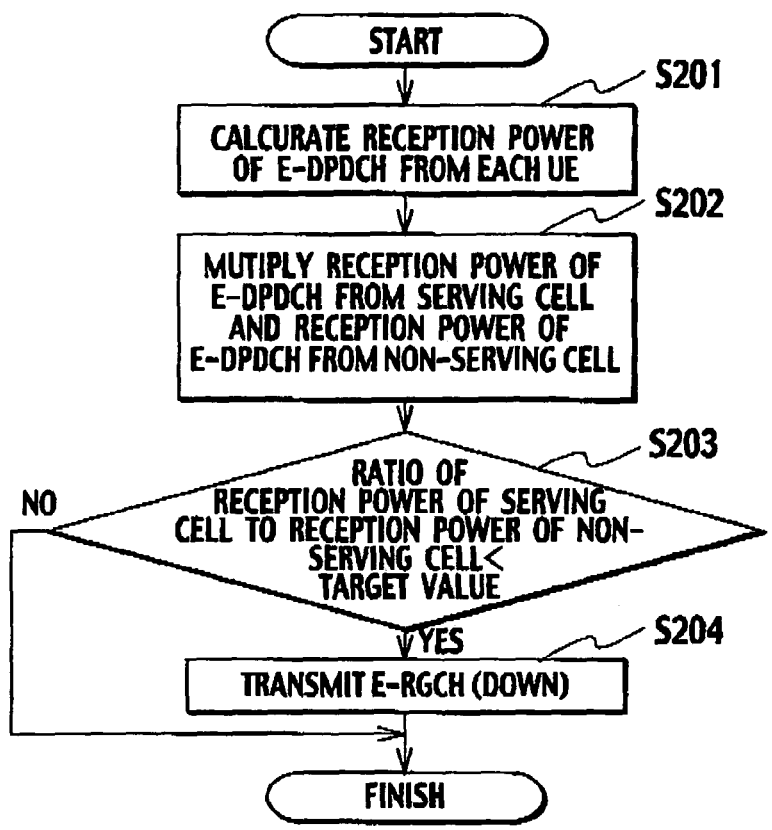
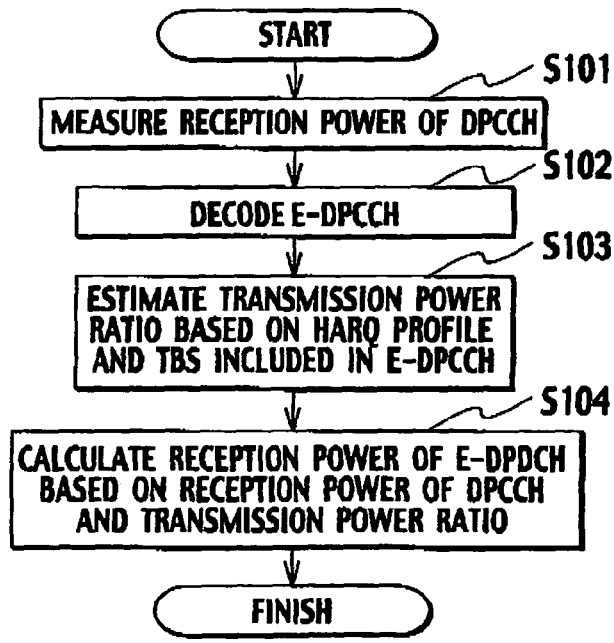

TRANSMISSION RATE CONTROL METHOD, MOBILE STATION, RADIO BASE STATION, AND RADIO NETWORK CONTROLLER

CROSS REFERENCE TO RELATED APPLICATION

This application is based upon and claims the benefit of priority from the prior Japanese Patent Application No. P2005-241877, filed on Aug. 23, 2005; the entire contents of which are incorporated herein by reference.

BACKGROUND OF THE INVENTION

1. Field of the Invention

The present invention relates to a transmission rate control method for controlling a transmission rate of uplink user which is transmitted from a mobile station via an Enhanced Dedicated Physical Data Channel, and a radio base station and a radio network controller used in the transmission rate control method.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)", Referring to FIG. 3, the mobile communication system, to which the "Enhanced Uplink" is applied, will be described.

In an example of FIG. 3, the cell #1 controlled by the radio base station Node B is a serving cell for a mobile station UE #1, which mainly controls the transmission rate of the uplink user data transmitted by the mobile station UE #1.

In addition, the cell #1 controlled by the radio base station Node B is not a serving cell for the mobile station UE #2 but a non-serving cell for the mobile station UE #2, which establishes a radio link with the mobile station UE #2.

In the above mobile communication system, the cell #1 is configured to transmit, to the mobile station UE #1, an "Enhanced Absolute Grant Channel (E-AGCH: absolute transmission rate control channel)" for transmitting an absolute transmission rate of the uplink user data.

In addition, the cell #1 is configured to transmit, to the mobile station CE #2, an "Enhanced Relative Grant Channel (E-RGCH: relative transmission rate control channel)" for transmitting a relative transmission rate of the uplink user data (for example, up Command, Down Command, Don't care command).

Further, in the above mobile communication system, both of the mobile station UE #1 and the mobile station UE #2 are configured to transmit an "Enhanced Dedicated Physical Control Channel (E-DPCCH)" and an "Enhanced Dedicated Physical Data Channel (E-DPDCH)".

Here, the cell #1 controlled by the radio base station Node B is configured to transmit a "Down Command" using the E-RGCH in order to minimize the interference from non-serving mobile station (the mobile station UE #2 in FIG. 3).

More specifically, the cell #1 is configured to transmit a "Down Command" using the E-RGCH, so as to hold a ratio of a reception power of the E-DPDCH from the serving mobile station (the mobile station UE #1 in FIG. 3) and a reception power of the E-DPDCH from the non-serving mobile station (i.e., interference power) less than or equal to the predetermined threshold.

Here, the serving mobile station for the cell #1 means the mobile station which sets the cell #1 as the serving cell, and the non-serving mobile stations mean the mobile stations which do not set the cell #1 as the serving cell.

In other word, in the above mobile communication system, MAC functions implemented in the radio base station Node B is configured to control a transmission rate of uplink user data of the mobile station UE using the E-AGCH and the E-RGCH.

However, in the above mobile communication system, the cell #1 controlled by the radio base station Node B is configured to measure the reception power of the E-DPDCH without knowing the patterns of uplink user data to be transmitted via the E-DPDCH. Thus, a huge measurement error can be happen in the above mobile communication system.

Accordingly, in the above mobile communication system, there has been a problem that it becomes difficult for each cell to adjust the ratio of the reception power of the E-DPDCH from the serving mobile station to the reception power of the E-DPDCH from the non-serving mobile station, due to the measurement error, and therefore, transmission efficiency is decreased.

BRIEF SUMMARY OF THE INVENTION

The present invention has been made considering the problems, and its object is to provide a transmission rate control method which enables to measure a reception power of an Enhanced Dedicated Physical Data Channel easily and accurately without knowing patterns of the uplink user data, and a radio base station and a radio network controller.

A first aspect of the present invention is summarized as a transmission rate control method for controlling, at a mobile station, a transmission rate of uplink user data to be transmitted via an Enhanced Dedicated Physical Data Channel, including: measuring, at a radio base station, a reception power of a dedicated physical control channel transmitted from the mobile station; extracting, at the radio base station, a transmission data block size of the uplink user data from an Enhanced Dedicated Physical Control Channel transmitted from the mobile station; acquiring, at the radio base station, a transmission power ratio of the Enhanced Dedicated Physical Data Channel to the Dedicated Physical Control Channel which corresponds to the extracted transmission data block size; calculating, at the radio base station, a reception power of the Enhanced Dedicated Physical Data Channel based on the measured reception power of the dedicated physical control channel and the acquired transmission power ratio; calculating, at the radio base station, a relative transmission rate of the uplink user data based on the calculated reception power of the Enhanced Dedicated Physical Data Channel; notifying, at the radio base station, the relative transmission rate of the uplink user data to the mobile station via a relative transmission rate control channel; and controlling, at the mobile station, the transmission rate of the uplink user data based on the notified relative transmission rate of the uplink user data.

In the first aspect, the method can further include: calculating, at the radio base station, the relative transmission rate of the uplink user data, based on the compared result of an integrated value of the reception power of the Enhanced Dedicated Physical Data Channel transmitted from a serving mobile station which sets the cell controlled by the radio base station as a serving cell and an integrated value of the reception power of the Enhanced Dedicated Physical Data Channel transmitted from a non-serving mobile station which does not set the cell controlled by the radio base station as a serving cell.

In the first aspect, the radio base station can store a plurality of correspondence tables in which the transmission data block size and the transmission power ratio of the Enhanced Dedicated Physical Data Channel to the dedicated physical control channel are corresponded; the radio network controller can notify an identification information on the correspondence table to the radio base station, when the mobile station establishes a data connection for transmitting the uplink user data; and the radio base station can acquire the transmission power ratio of the Enhanced Dedicated Physical Data Channel to the dedicated physical control channel which corresponds to the extracted transmission data block size with reference to the correspondence table which can be identified by the notified identification information.

A second aspect of the present invention is summarized as a radio base station used in a mobile communication system for controlling a transmission rate of uplink user data which is transmitted via an Enhanced Dedicated Physical Data Channel at a mobile station, including; a measuring unit configured to measure a reception power of a dedicated physical control channel transmitted from the mobile station; a transmission data block size extracting unit configured to extract a transmission data block size of the uplink user data from an Enhanced Dedicated Physical Control Channel transmitted from the mobile station; a transmission power ratio acquiring unit configured to acquire a transmission power ratio of the Enhanced Dedicated Physical Data Channel to the dedicated physical control channel which corresponds to the extracted transmission data block size; an Enhanced Dedicated Physical Data Channel reception power calculating unit configured to calculate a reception power of the Enhanced Dedicated Physical Data Channel, based on the measured reception power of the dedicated physical control channel and the acquired transmission power ratio; an uplink user data relative transmission rate calculating unit configured to calculate a relative transmission rate of the uplink user data, based on the calculated reception power of the Enhanced Dedicated Physical Data Channel; and a relative transmission rate control channel notifying unit configured to notify the relative transmission rate of the uplink user data via a relative transmission rate control channel.

In the second aspect, the uplink user data relative transmission rate calculating unit can be configured to calculate the relative transmission rate of the uplink user data, based on the compared result of an integrated value of the reception power of the Enhanced Dedicated Physical Data Channel transmitted from a serving mobile station which sets the cell controlled by the radio base station as a serving cell and an integrated value of the reception power of the Enhanced Dedicated Physical Data Channel transmitted from a non-serving mobile station which does not set the cell controlled by the radio base station as a serving cell.

A third aspect of the present invention is summarized as a radio network controller used in a mobile communication system for controlling a transmission rate of uplink user data which is transmitted via an Enhanced Dedicated Physical Data Channel at a mobile station, wherein the radio network controller is configured to notify, to the radio base station, an identification information on a correspondence table in which transmission data block size and a transmission power ratio of an Enhanced Dedicated Physical Data Channel to a dedicated physical control channel are corresponded, when the mobile station establishes a data connection for transmitting the uplink user data.

BRIEF DESCRIPTION OF THE SEVERAL VIEWS OF THE DRAWINGS

FIG. 18 is a diagram showing an example of HARQ profiles used in the mobile communication system according to the first embodiment of the present invention.

FIG. 19 is a diagram showing an example of HARQ profiles used in the mobile communication system according to the first embodiment of the present invention.

FIG. 20 is a flowchart showing operations of controlling a transmission power of uplink user data in the mobile communication system according to the first embodiment of the present invention.

FIG. 21 is a flowchart showing operations of estimating a reception power of the E-DPDCH at the radio base station in the mobile communication system according to the first embodiment of the present invention.

DETAILED DESCRIPTION OF THE INVENTION (Configuration of Mobile Communication System According to First Embodiment of the Present Invention)

Referring to FIGS. 4 to 16, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
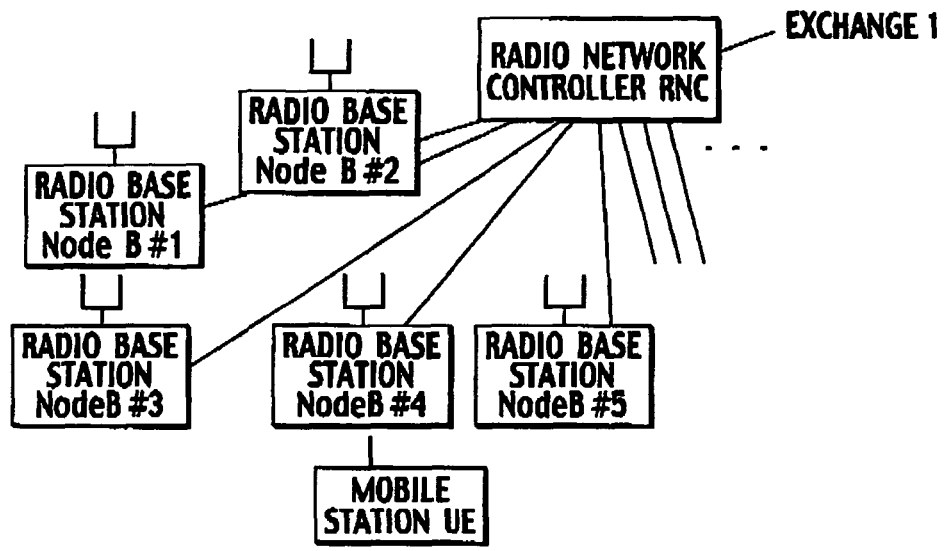
FIG. 1 is diagram of an entire configuration of a general mobile communication system.
Figure 2A:
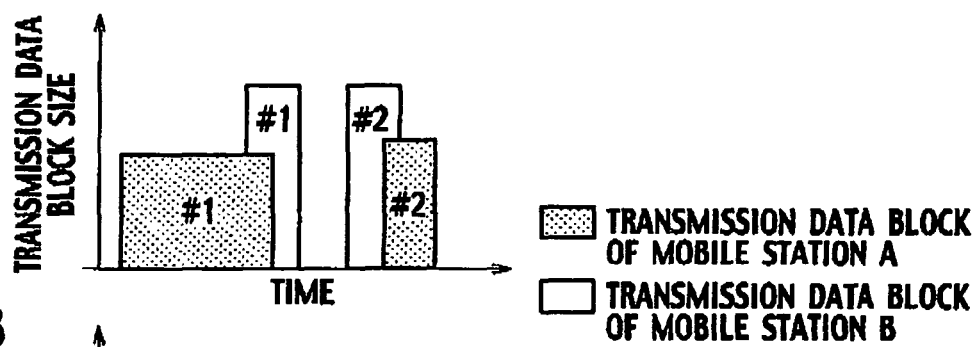
FIGS. 2A to 2C are graphs for explaining the method for controlling a transmission rate of uplink user data in a conventional mobile communication system.
Figure 2B:
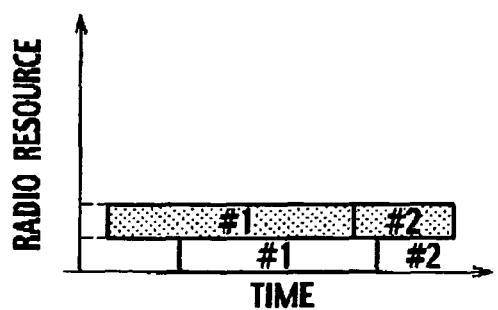
Figure 2C:
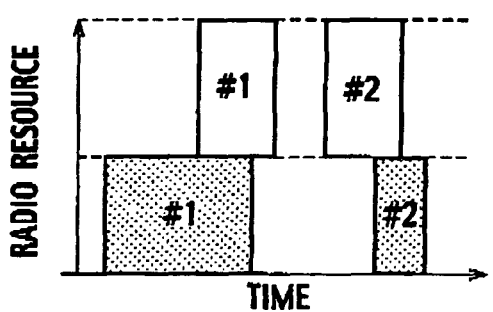
Figure 3:
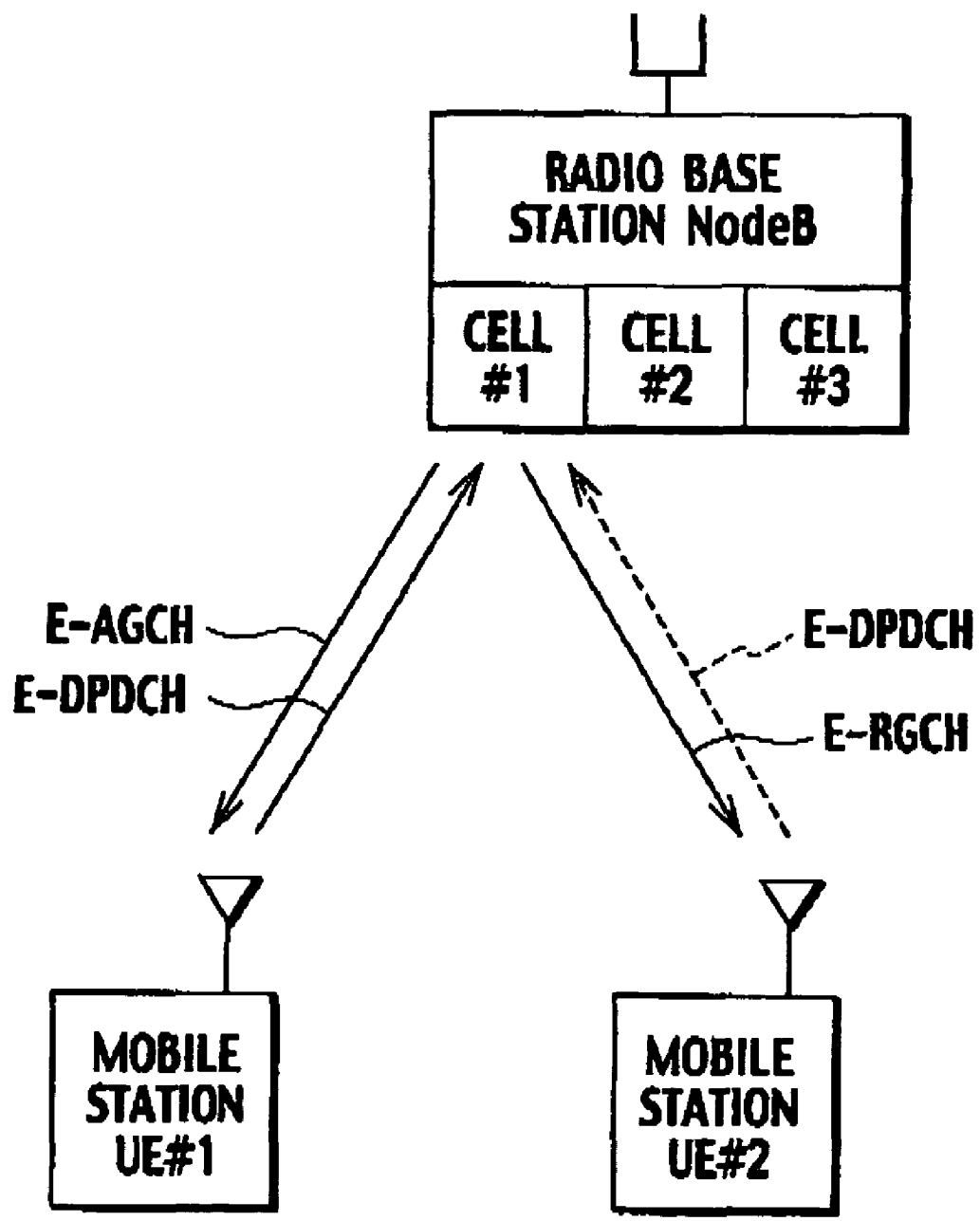
FIG. 3 is a diagram of an entire configuration of the conventional mobile communication system.
Figure 4:
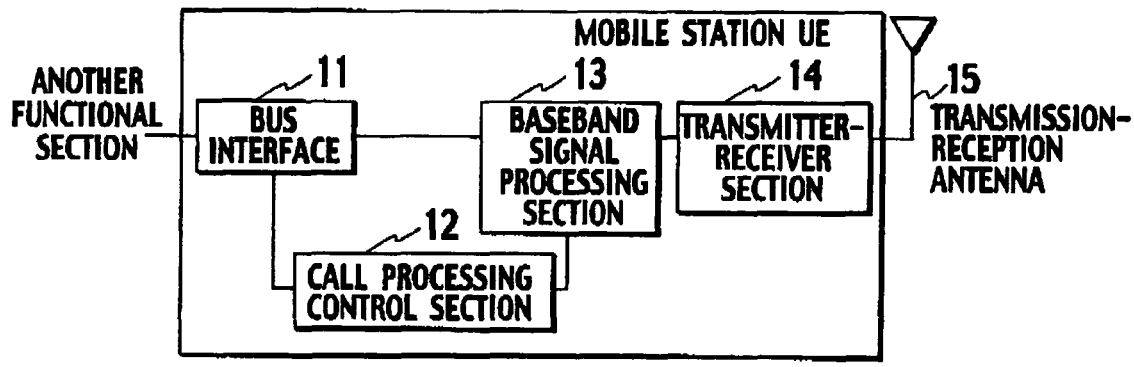
FIG. 4 is a functional block diagram of a mobile station in the mobile communication system according to the first embodiment of the present invention.

An example of general configuration of a mobile station UE according to this embodiment is shown in FIG. 4.

As shown in FIG. 4, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 4).

However, these functions do not have to be independently present as hardware. That is, these functions can be partly or entirely integrated, or can be configured through a process of software.

Figure 5:
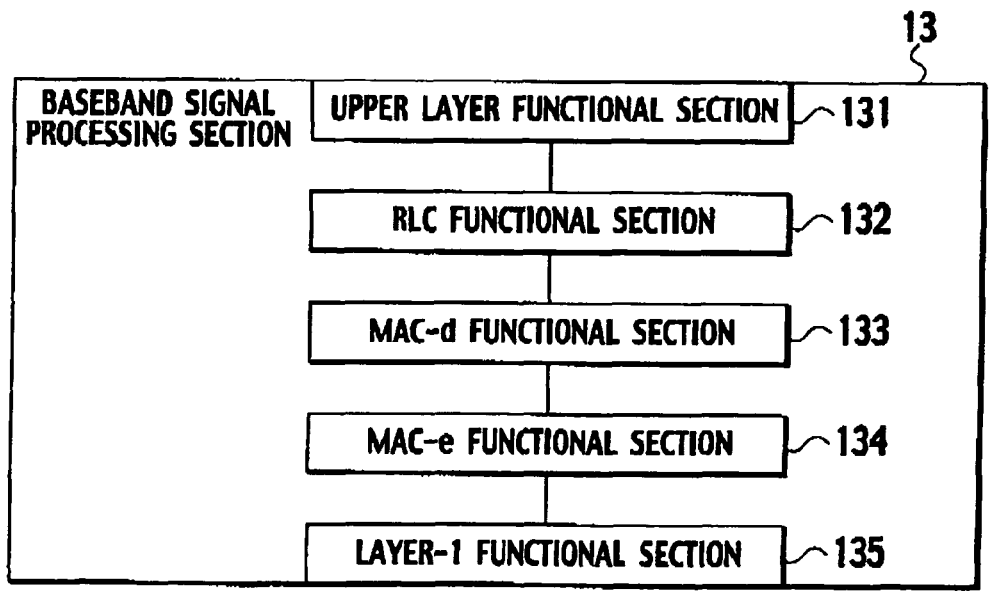
FIG. 5 is a functional block diagram of a baseband signal processing section of the mobile station in the mobile communication system according to the first embodiment of the present invention.

In FIG. 5, a functional block of the baseband signal processing section 13 is shown.

As shown in FIG. 5, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 6:
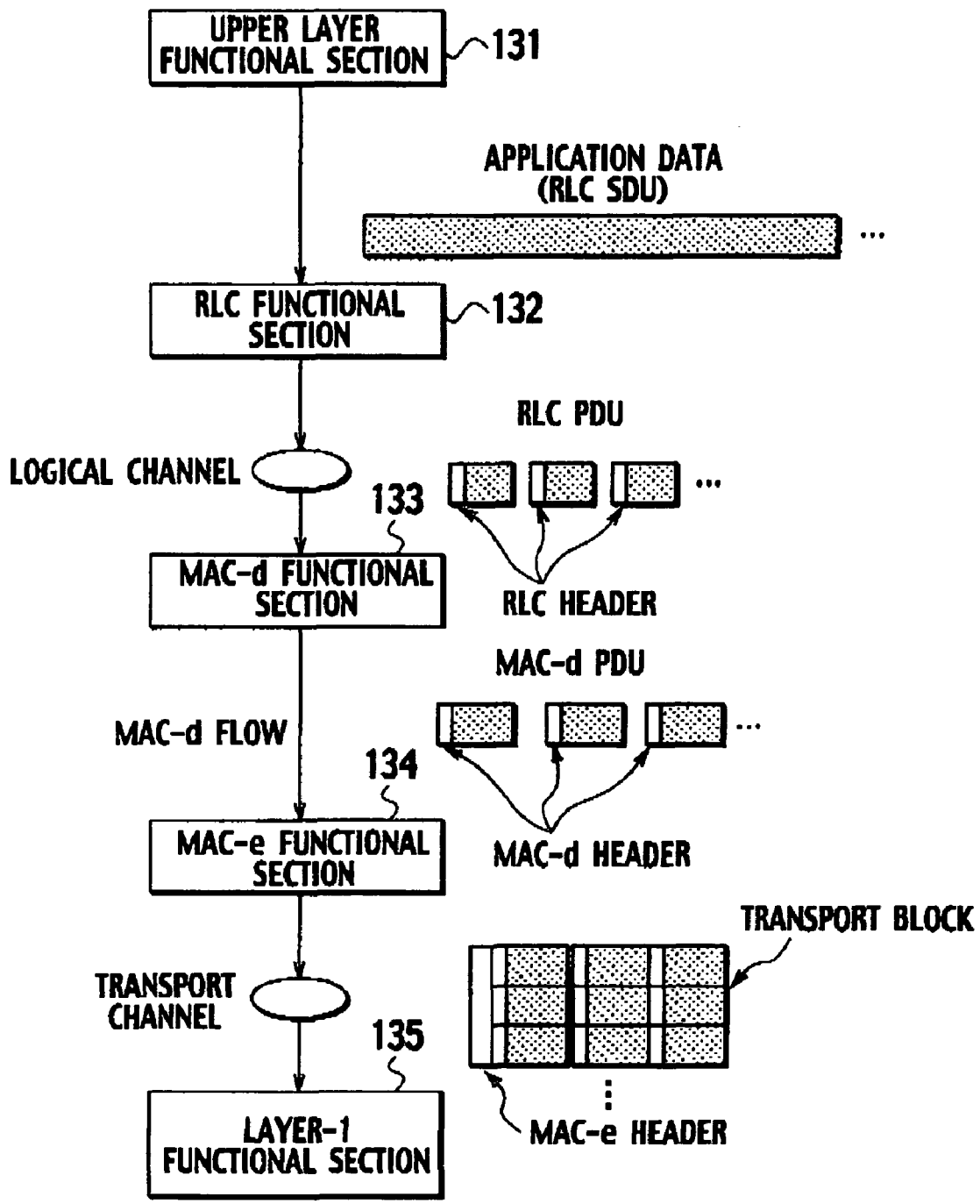
FIG. 6 is a diagram for explaining functions of the baseband signal processing section of the mobile station in the mobile communication system according to the first embodiment of the present invention.

As shown in FIG. 6, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAc-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 7:
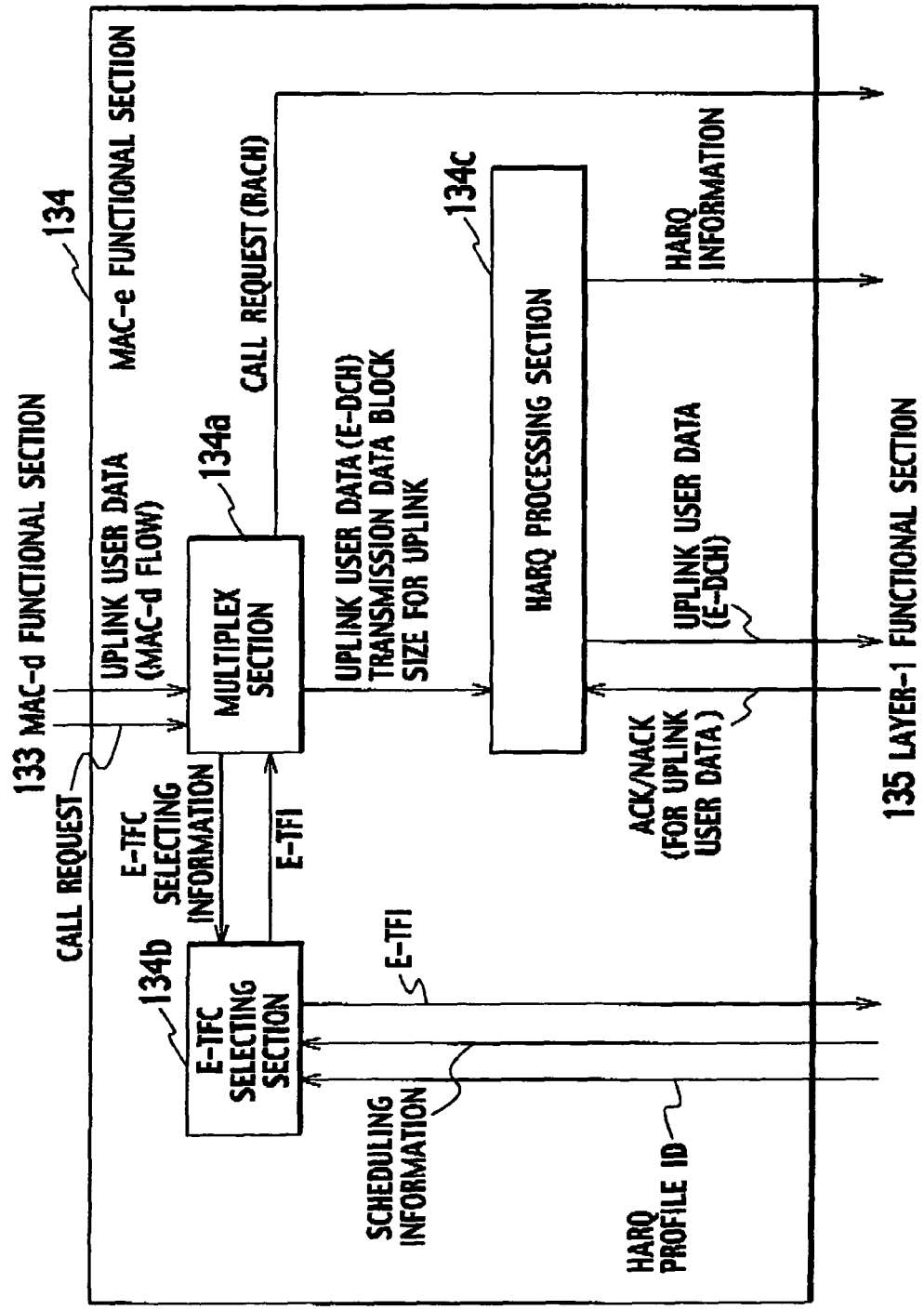
FIG. 7 is a functional block diagram of a MAC-e functional section in the baseband signal processing section of the mobile station in the mobile communication system according to the first embodiment of the present invention.
Figure 8:
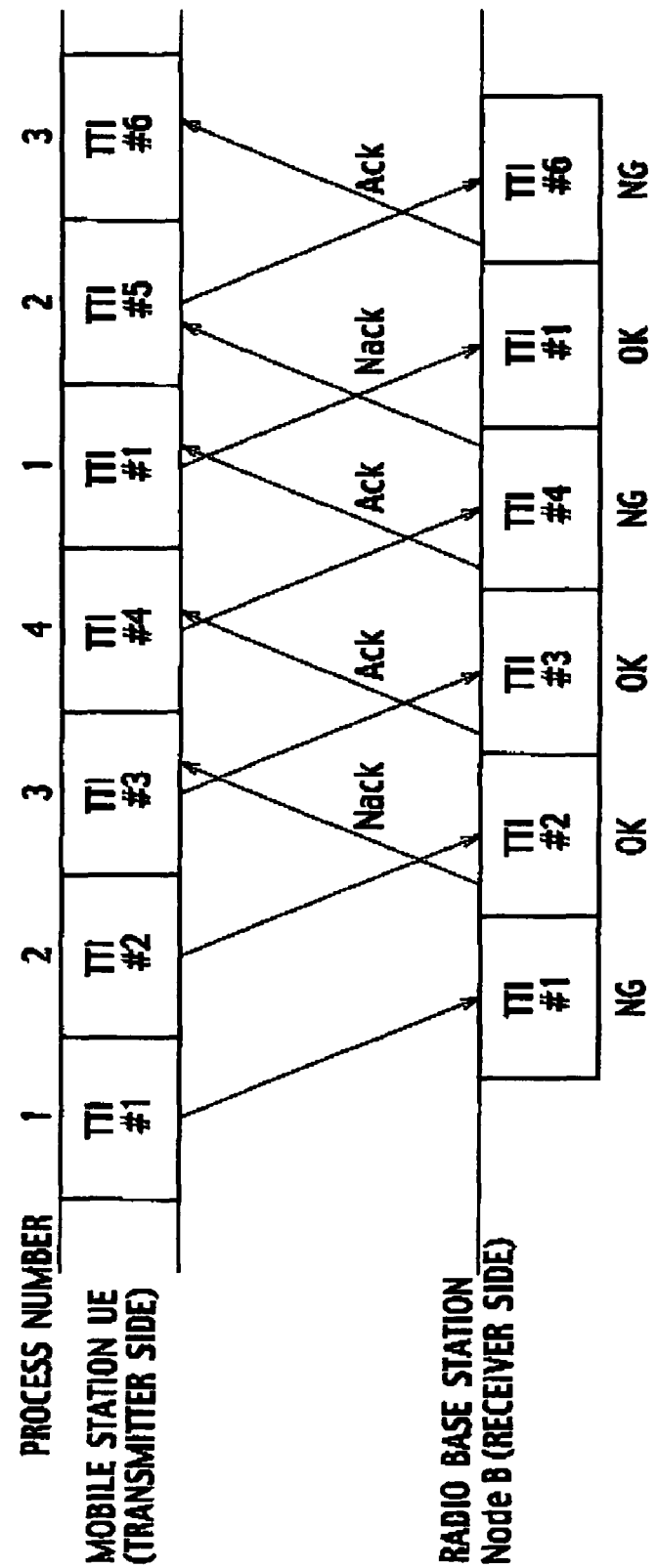
FIG. 8 is a graph illustrating an operation of four channel stop and wait protocol performed by an HARQ processing section in the MAC-e functional section in the baseband signal processing section of the mobile station in the mobile communication system according to the first embodiment of the present invention.

Specifically, as shown in FIG. 7, the MAC-e functional section 134 is provided with a multiplex section 134a, an E-TFC selecting section 134b, and an HARQ processing section 134c.

The multiplex section 134a is configured to perform a multiplex processing to the uplink user data, which is received from the MAC-d functional section 133 as MAC-d flow, based on a "Enhanced—Transport Format Indicator (E-TFI)" notified from the E-TPC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the E-TFC selecting section 134b, E-TFC selecting information for selecting a transport format for the received uplink user data.

Here, the E-TFC selecting information includes data size and priority class of the uplink user data, or the like.

In addition, when the multiplex section 134a receives a call request from the MAC-d functional section 133, the multiplex section 134a is configured to multiply the call request on a "Random Access Channel (RACH)" so as to transmit the call request to the layer-1 functional section 135.

Here, the call request requests to establish a data connection (Dedicated Channel (DCH), E-DPDCH) for transmitting uplink user data to the mobile station UE.

Figure 9:
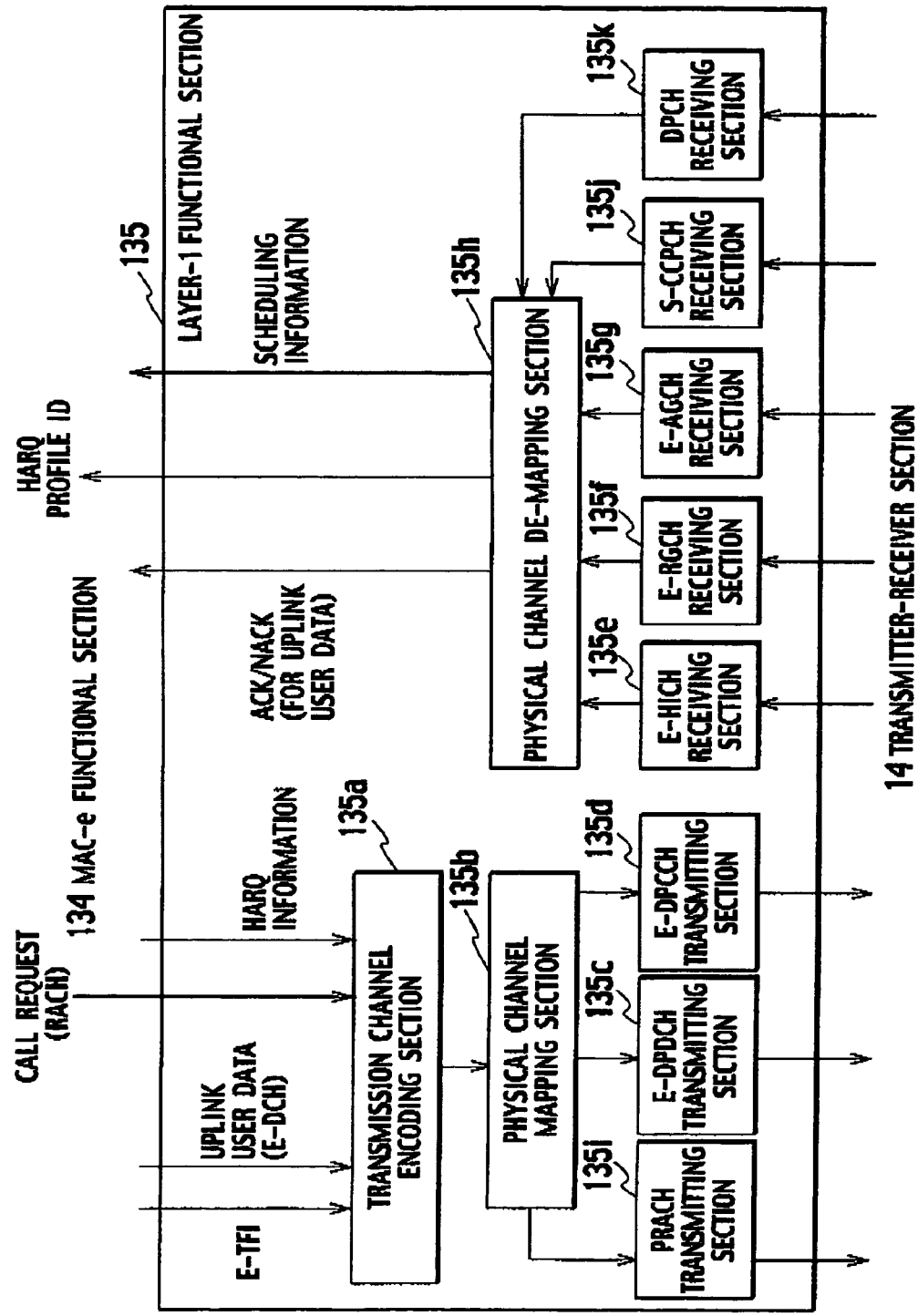
FIG. 9 is a functional block diagram of a layer-1 functional section in the baseband signal processing section of the mobile station in the mobile communication system according to the first embodiment of the present invention.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135. An example for operations of the "4 channel stop and wait protocol" is shown in FIG. 9.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data from the serving cell for the mobile station via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (Down command or Don't care command) from the non-serving cell for the mobile station via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

In addition, the E-TFC selecting section 134b is configured to store an HARQ profile The HARQ profile is a correspondence table which associates a transmission data block size of the uplink user data with a transmission power ratio of the E-DPDCH to the DPCCH (in other words, the E-DPDCH transmission power ratio, or the E-DPDCH transmission power offset) (Refer to FIG. 18).

In addition, the E-TFC selecting section 134b can be configured to store the predetermined HARQ profile, or to store the HARQ profile which is received via a control connection (a "Dedicated Physical Control Channel (DPCCH)") for transmitting/receiving control information between the mobile station UE and the radio network controller RNC.

Further, the E-TFC selecting section 134b can be configured to store the different HARQ profiles per logical channel, or per upper layer flows (Refer to FIG. 19).

The correspondence between the transmission data block size of uplink user data and the E-DPDCH transmission power ratio in a transport format of uplink user data is set so as to satisfy the correspondence between the transmission data block size of the uplink user data and the E-DPDCH transmission power ratio in the HARQ profile.

As shown in FIG. 9, the layer-1 functional section 135 is provided with a transmission channel encoding section 135a, a physical channel mapping section 135b, an E-DPDCH transmitting section 135c, an E-DPCCH transmitting section 135d, an E-HICH receiving section 135e, an E-RGCH receiving section 135f, an E-AGCH receiving section 135g, a physical channel de-mapping section 135h, a PRACH transmitting section 135i, a S-CCPCH receiving section 135j, and a DPCH receiving section 135k.

Figure 10:
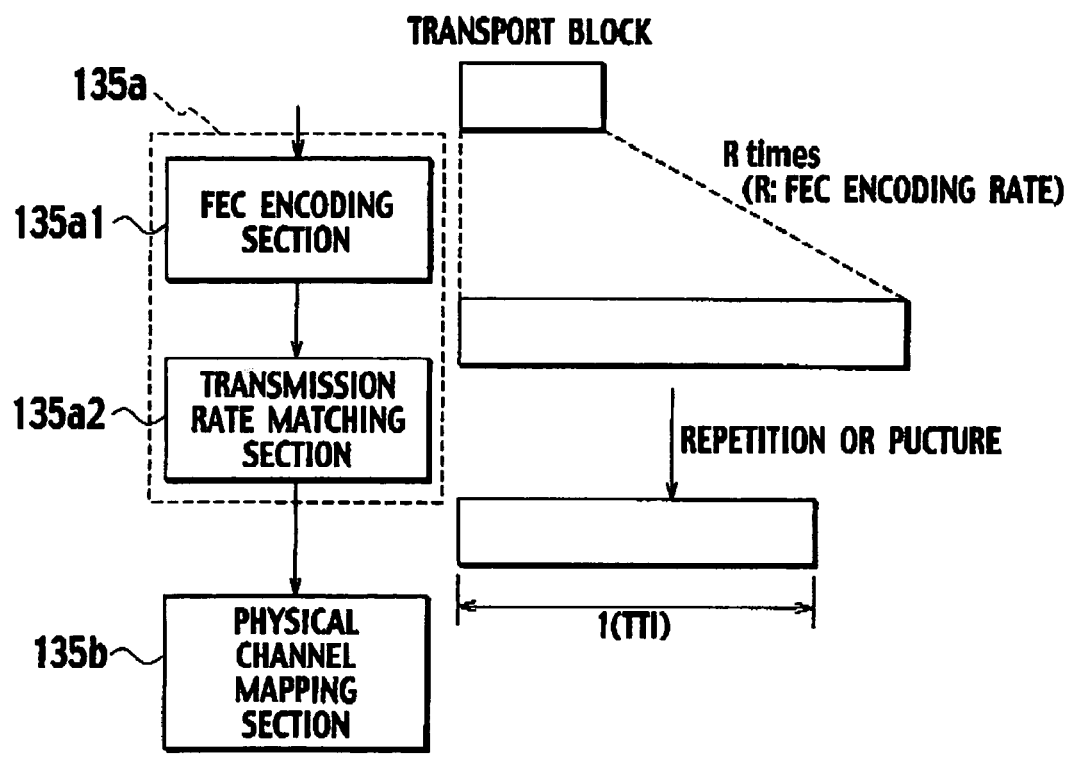
FIG. 10 is a diagram for explaining functions of the layer-1 functional section in the baseband signal processing section of the mobile station in the mobile communication system according to the first embodiment of the present invention.

As shown in FIG. 10, the transmission channel encoding section 135a is provided with a FEC (Forward Error Correction) encoding section 135a1, and a transmission rate matching section 125a2.

As shown in FIG. 10, the FEC encoding section 135a1 is configured to perform the error correction encoding processing toward the "uplink user data (E-DCH)", that is, the transport block, transmitted from the MAC-e functional section 134.

In addition, as shown in FIG. 10, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, to pair the E-TFI and the HARQ information from the transmission channel encoding section 135a with the E-DPCCH, and to pair the call request (RACH) from the transmission channel encoding section 135a with a "Physical Random Access Channel (PRAC)".

The E-DPDCH transmitting section 135c is configured to perform a transmission processing of the E-DPDCH.

The E-DPCCH transmitting section 135d is configured to perform a transmission processing of the E-DPCCH.

Here, it is configured that the E-DPCCH is paired with format information on the E-DPDCH (for example, a transmission data block size of uplink user data, and the like).

The PRACH transmitting section 135i is configured to perform a transmission processing of the PRACH.

The E-HICH receiving section 135e is configured to receive an "E-DCH HARQ Acknowledgement Indicator Channel (E-HICH)" transmitted from the radio base station Node B.

The E-RGCH receiving section 135f is configured to receive the E-RGCH transmitted from the radio base station Node B (the serving cell and the non-serving cell for the mobile station UE).

The E-AGCH receiving section 135g is configured to receive the E-AGCCH transmitted from the radio base station Node B (the serving cell for the mobile station UE).

The S-CCPCH receiving section 135j is configured to receive a "Secondary Common Control Physical Channel (S-CCPCH)" transmitted from the radio base station Node B.

The DPCH receiving section 135k is configured to receive the DPCH transmitted from the radio base station Node B.

Here, a "control connection setup response" is transmitted via the DCH or the E-DCH. The control connection setup response notifies that a control connection for transmitting control information to the mobile station UE has been established.

The physical channel de-mapping section 135h is configured to extract the ACK/NACK for the uplink user data which is included in the E-HICH received by the E-HICH receiving section 135e, so as to transmit the extracted ACK/NACK for the uplink user data to the MAC-e functional section 134.

In addition, the physical channel de-mapping section 135h is configured to extract the scheduling information (the relative transmission rate of the uplink user data, that is, Up command/Down command/Don't care command) which is included in the E-RGCH received by the E-RGCH receiving section 135f, so as to transmit the extracted scheduling information to the MAC-e functional section 134.

In addition, the physical channel de-mapping section 135h is configured to extract the scheduling information (the absolute transmission rate of the uplink user data) which is included in the E-AGCH received by the E-AGCH receiving section 135g, so as to transmit the extracted scheduling information to the MAC-e functional section 134.

Figure 11:
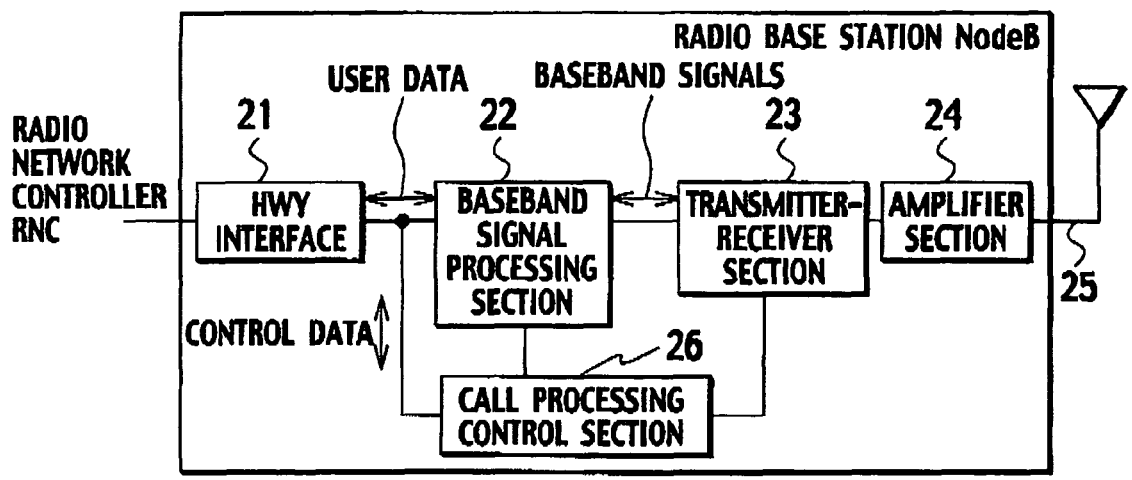
FIG. 11 is a functional block diagram of a radio base station according to the first embodiment of the present invention.

FIG. 11 shows an example of a configuration of functional blocks of a radio base station Node B according to this embodiment.

As shown in FIG. 11, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 12:
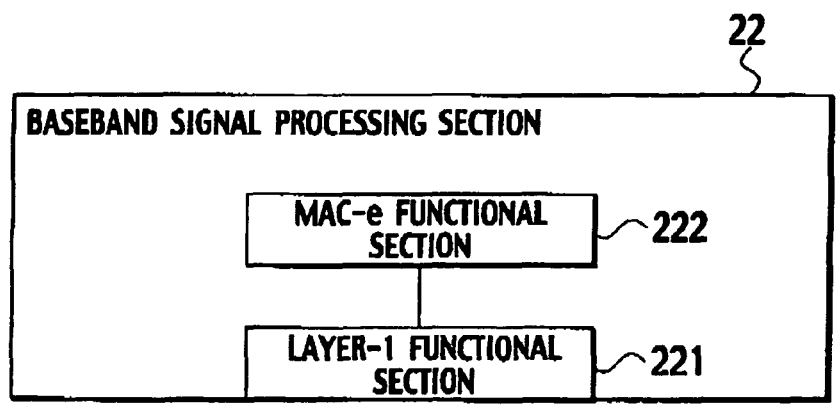
FIG. 12 is a functional block diagram of a baseband signal processing section in the radio base station of the mobile communication system according to the first embodiment of the present invention.

FIG. 12 is a functional block diagram of the baseband signal processing section 22.

As shown in FIG. 12, the baseband signal processing section 22 is provided with a layer-1 functional section 221, and a MAC-e functional section 222.

Figure 13:
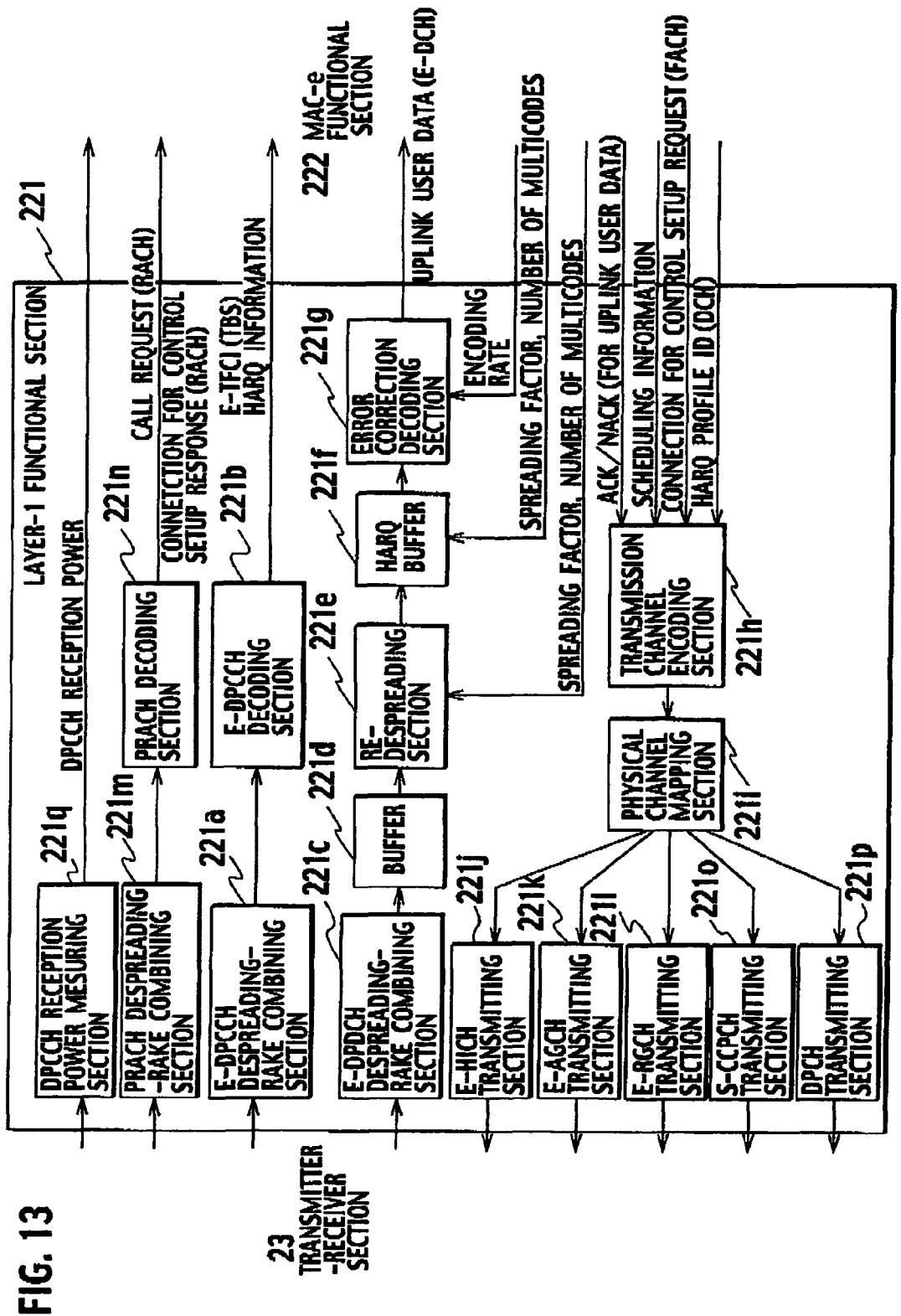
FIG. 13 is a functional block diagram of a layer-1 functional section in the baseband signal processing section in the radio base station of the mobile communication system according to the first embodiment of the present invention.

As shown in FIG. 13, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 2211, a PRACH despreading-RAKE combining section 221m, a PRACH decoding section 221n, a S-CCPCH transmitting section 221o, and a DPCH transmitting section 221p.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAc-e functional section 222.

To be more specific, the E-DPCCH decoding section 221b is configured to extract a transmission data block size (TBS) of the uplink user data from the E-DPCCH transmitted from the mobile station UE, and to notify the extracted transmission data block size to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221d using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the HARQ buffer 221f based on the coding rate which is notified from the MAC-e functional section 222, so as to transmit the acquired "uplink user data (E-DCH)" to the MAC-e functional section 222.

The PRACH despreading-RAKE combining section 221m is configured to perform the despreading processing and RAKE combining processing to the PRACH.

In addition, the PRACH decoding section 221n is configured to decode the call request or the connection for control setup response, which are transmitted from the mobile station UE, based on the output from the PRACH despreading-RAKE combining section 221m, so as to transmit the decoded call request or connection for control setup response to the MAC-e functional section 222 via a "Random Access Channel (RACH)".

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221h, with the E-RGCH.

In addition, the physical channel mapping section 221i is configured to pair a control connection setup request, which requests to establish a control connection for transmitting the control information to the mobile station UE, with the S-CCPCH.

Furthermore, the physical channel mapping section 221i is configured to pair a logical control channel, which notifies the HARQ profile ID and the like to the mobile station UE, with the DPDCH.

The E-HICH transmitting section 221j is configured to perform the transmission processing of the E-HICH.

The E-AGCH transmitting section 221k is configured to perform the transmission processing of the E-AGCH.

The E-RGCH transmitting section 2211 is configured to perform the transmission processing of the E-RGCH.

The S-CCPCH transmitting section 221o is configured to perform the transmission processing of the S-CCPCH.

The DPCH transmitting section 221p is configured to perform the transmission processing of the DPCH.

The DPCCH reception power measuring section 221q is configured to measure the reception power of the received DPCCH, and to notify the measurement result to the MAC-e functional section 222.

Figure 14:
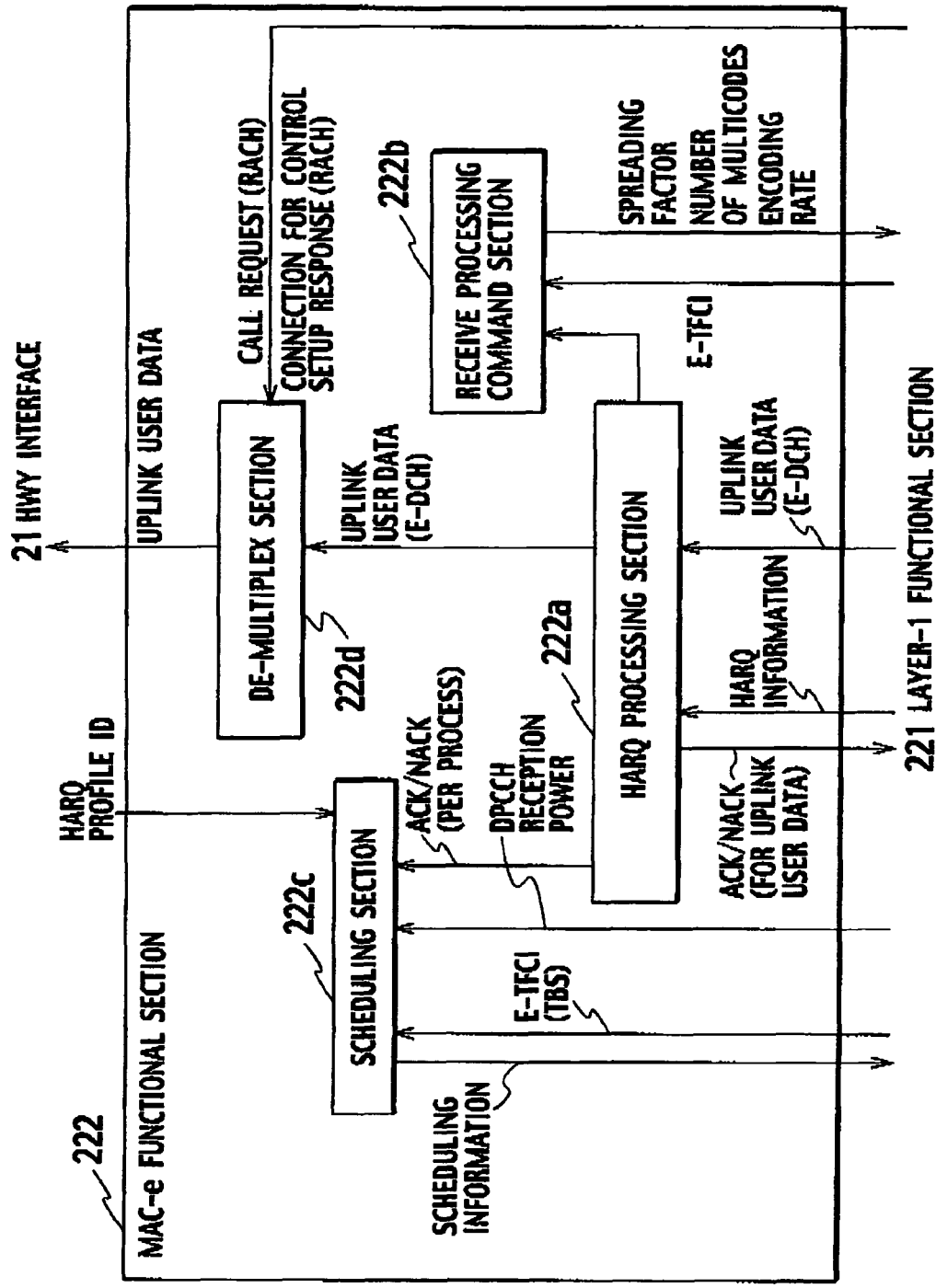
FIG. 14 is a functional block diagram of a MAC-e functional section in the baseband signal processing section in the radio base station of the communication system according to the first embodiment of the present invention.

As shown in FIG. 14, the MAC-e functional section 222 is provided with an HARQ processing section 222a, a receive processing command section 222b, a scheduling section 222c, a de-multiplex section 222d, a multiplex section 222e.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

The receive processing command section 222b is configured to notify, to the re-despreading section 221e and the HARQ buffer 221f, the spreading factor and the number of multi-codes for the transport format of each mobile station UE, which is specified by the E-TFCI per TTI received from the E-DPCCH decoding section 221b in the layer-1 functional section 221. Then, the receive processing command section 222b is configured to notify the encoding rate to the error correction decoding section 221g.

The scheduling section 222c is configured to change the absolute transmission rate or the relative transmission rate of the uplink user data, based on the E-TFCI per TTI received from the E-DPCCH decoding section 221b in the layer-1 functional section 221, the ACK/NACK per process received from the HARQ processing section 222a, the interference level, and the like.

In addition, the scheduling section 222c is configured to store one or plurality of HARQ profiles, as well as the E-TFC selecting section 134b in the mobile station UE.

In addition, the scheduling section 222c is configured to acquire the E-DPDCH transmission power ratio which corresponds to the transmission data block size of the uplink user data transmitted from the layer-1 functional section 222 (the transmission data block size of the uplink user data extracted by the E-DPCCH decoding section 221b), with reference to the stored HARQ profiles.

In addition, the scheduling section 222c is configured to acquire the E-DPDCH transmission power ratio by referring to the HARQ which can be identified by the HARQ profile ID (identification information on the correspondence table) notified from the radio network controller RNC, when the scheduling section 222c stores a plurality of HARQ profiles.

Furthermore, when the HARQ profile is stored differently per logical channel, a logical ID can be designated as the HARQ profile ID. When the HARQ profile is stored differently per upper layer flow, a flow ID can be designated as the HARQ profile ID.

Furthermore, the scheduling section 222c is configured to calculate the reception power of the E-DPDCH, based on the measured reception power of the DPCCH and the acquired E-DPDCH transmission power ratio.

The scheduling section 222c is configured to calculate the relative transmission rate of the uplink user data, based on the calculated reception power of the E-DPDCH.

To be more specific, the scheduling section 222c is configured to calculate the relative transmission power of the uplink user data, based on the compared result of an integrated value of a reception power of the E-DPDCH transmitted from the serving mobile station which sets the cell controlled by the radio base station as a serving cell and an integrated value of a reception power of the E-DPDCH transmitted from the non-serving mobile station which does not set the cell controlled by the radio base station as a serving cell.

In addition, the scheduling section 222c is configured to notify, to the layer-1 functional section 221, the absolute transmission rate or the relative transmission rate of the uplink user data, as the scheduling information.

The de-multiplex section 222d is configured to perform the de-multiplex processing to the "uplink user data (E-DCH)" received from the HARQ processing section 222a, so as to transmit the acquired uplink user data to the HWY interface 21.

In addition, the de-multiplex section 222d is configured to perform the de-multiplex processing to the call request (RACH) and the connection for control setup response (RACH) which are received from the layer-1 functional section 221, so as to transmit the acquired result of de-multiplex processing to the HWY interface 21.

The radio network controller RNC according to this embodiment is an apparatus located in an upper level of the radio base station Node B, and is configured to control radio communications between the radio base station Node B and the mobile station UE.

Figure 15:
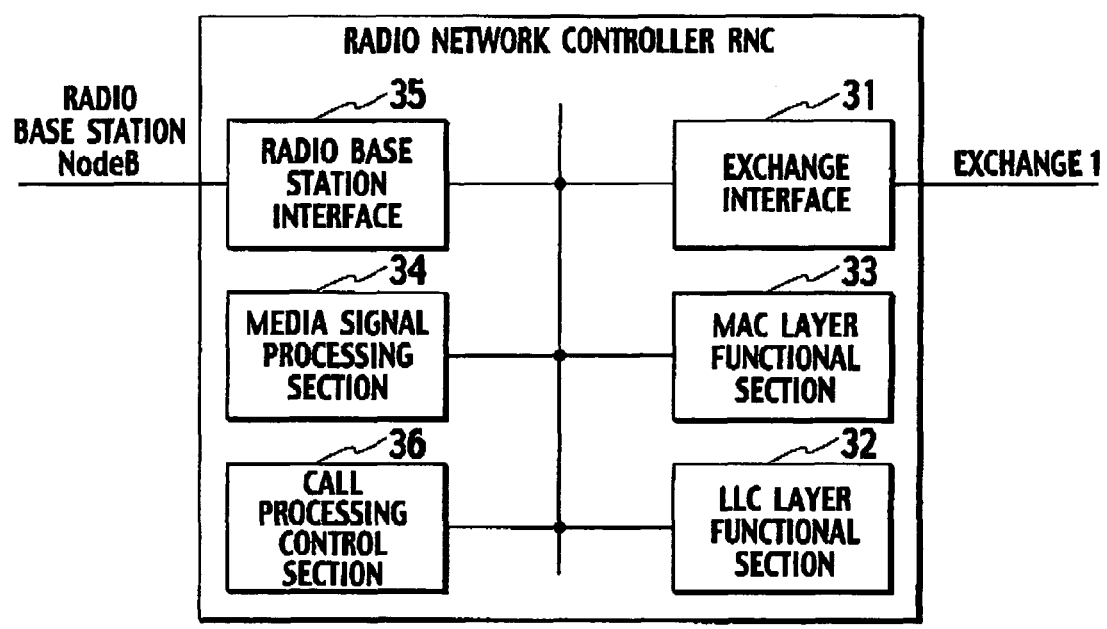
FIG. 15 is a functional block diagram of a radio network controller of the mobile communication system according to the first embodiment of the present invention.

As shown in FIG. 15, the radio network controller RNC according to this embodiment is provided with an exchange interface 31, a Logical Link Control (LLC) layer processing section 32, a MAC layer processing section 33, a media signal processing section 34, a radio base station interface 35, and a call processing control section 36.

The exchange interface 31 is an interface with an exchange 1, and is configured to forward the downlink signals transmitted from the exchange 1 to the LLC layer processing section 32, and to forward the uplink signals transmitted from the LLC layer processing section 32 to the exchange 1.

The LLC layer processing section 32 is configured to perform an LLC sub-layer processing such as a combining processing of a header or a trailer such as a sequence pattern number.

The LLC layer processing section 32 is also configured to transmit the uplink signals to the exchange interface 31 and to transmit the downlink signals to the MAC layer processing section 33, after the LLC sub-layer processing is performed.

The MAC layer processing section 33 is configured to perform a MAC layer processing such as a priority control processing or a header adding processing.

The MAC layer processing section 33 is also configured to transmit the uplink signals to the LLC layer processing section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer processing section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer processing section 33 (or the media signal processing section 34) and to forward the downlink signals transmitted from the MAC layer processing section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 can be configured to notify the HARQ profile ID to the radio base station Node B, when the mobile station UE establishes a data connection (DCH, E-DPDCH) for transmitting the uplink user data.

In addition, if there is only one HARQ profile, the call processing control section 36 can be configured not to notify the HARQ profile ID, when the mobile station UE establishes a data connection (DCH, E-DPDCH) for transmitting the uplink user data.

(Operations of Mobile Communication System According to First Embodiment of the Present Invention)

Referring to FIGS. 16 to 21, operations of the mobile communication system according to this embodiment will be described.

Firstly, referring to FIG. 16, operation of setting up a cell in the mobile communication system according to this embodiment will be described.

Figure 16:
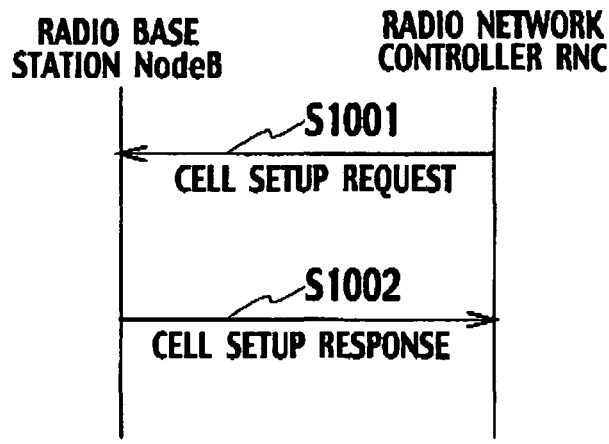
FIG. 16 is a sequence diagram showing operations of setting up a cell in the mobile communication system according to the first embodiment of the present invention.

As shown in FIG. 16, in step S1001, the radio network controller RNC transmit a cell setup request to the radio base station Node B, when the radio base station Node B is set up, or when the radio network controller RNC changes the parameters to be set to the radio base station Node B.

Using the cell setup request, for example, the target value for a ratio of a reception power of the E-DPDCH from the serving mobile station to a reception power of the E-DPDCH from the non-serving mobile station will be notified.

In step S1002, the radio base station Node B transmits a cell setup response to the radio network controller RNC. The call setup response notifies that the parameter, which is notified by the cell setup request from the radio network controller RNC, has been set.

Secondly, referring to FIG. 17, operations of establishing a data connection in the mobile communication system according to this embodiment will be described.

Figure 17:
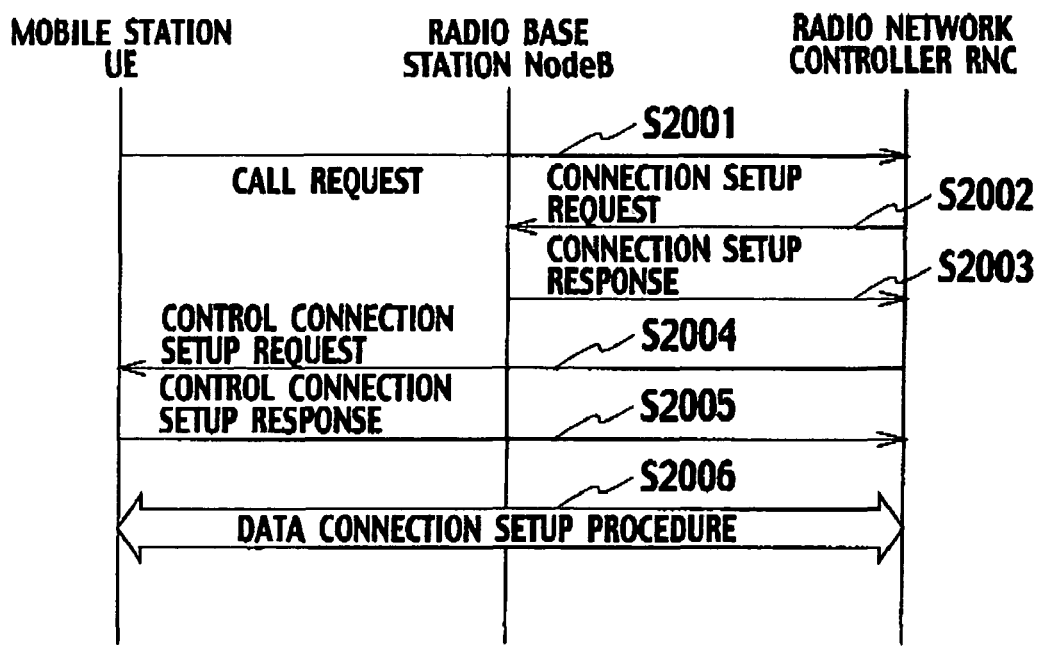
FIG. 17 is a sequence diagram showing operations of establishing a data connection in the mobile communication system according to the first embodiment of the present invention.

As shown in FIG. 17, in step S2001, the mobile station UE transmits a call request using the PRACH (RACH). The call request requests to establish a data connection for transmitting uplink user data.

In step S2002, the radio network controller RNC transmits a connection setup request to the radio base station Node B which controls the serving cell for the mobile station UE, based on the received call request. The connection setup request requests to set the connection of data requested by the mobile station UE.

In step S2003, the radio base station Node B transmit a connection setup response to the radio network controller RNC, if it is determined that the data connection can be established between the mobile station UE and the radio base station Node B.

In step S2004, the radio network controller RNC transmits a control connection setup request to the mobile station UE using the S-CCPCH (FACH). The control connection setup request requests to establish a control connection for transmitting control information toward the mobile station UE.

In step S2005, the mobile station UE transmits a control connection setup response to the radio network controller RNC using the DCH or E-DCH, so as to notify that the control connection has been established.

In step S2006, the above-described data connection is established using the control connection.

Here, the radio network controller RNC notifies the HARQ profile ID to the radio base station Node B, when a plurality of HARQ profiles are stored in the mobile station UE and the radio base station Node B.

As a result, the HARQ profile which is specified by the notified HARQ profile ID will be used in the operation of controlling the transmission rate of uplink user data at the radio base station Node B described later on.

On the other hand, the radio network controller RNC does not have to notify the HARQ profile ID to the mobile station UE and the radio base station Node B, when only one HARQ profile is stored in the mobile station UE and the radio base station Node B.

Thirdly, referring to FIG. 20 and FIG. 21, operation of controlling the transmission rate of the uplink user data in the mobile communication system according to this embodiment will be described.

As shown in FIG. 20, in step S201, the radio base station Node B estimates a reception power of the E-DPDCH from each mobile station UE which has established a radio link with the radio base station Node B.

In other words, the radio base station Node B estimates a reception power of the E-DPDCH from each mobile station from which the radio base station Node B is set to receive the E-DPDCH.

Referring to FIG. 21, operations of estimating the reception power of the E-DPDCH from each mobile station UE will be described.

As shown in FIG. 21, in step S101, the radio base station Node B measures the reception power of the DPCCH transmitted from the mobile station UE.

In step S102, the radio base station Node B decodes the E-DPCCH transmitted from the mobile station UE, and extracts a transmission data block size (TBS) of the uplink user data from the decoded E-DPCCH.

In step S103, the radio base station Node B acquires the E-DPDCH transmission power ratio which corresponds to the extracted transmission data block size of the uplink user data, with reference to the HARQ profile which is specified by the HARQ profile ID notified from the radio network controller RNC in step S2006.

In step S104, the radio base station Node B calculates a reception power of the E-DPDCH, based on the measured reception power of the DPCCH and the acquired E-DPDCH transmission power ratio.

To be more specific, the radio base station Node B estimates a result of multiplication between the measured reception power of the DPCCH and the E-DPDCH transmission power ratio as the reception power of the E-DPDCH.

Referring to FIG. 20 again, in step S202, the radio base station Node B calculate the integrated value of the reception power of the E-DPDCH transmitted from the serving mobile station for the radio base station Node B and the integrated value of the reception power of the E-DPDCH transmitted from the non-serving mobile station for the radio base station Node B.

In step S203, the radio base station Node B compares the integrated value of the reception power of the E-DPDCH transmitted from the serving mobile station for the radio base station Node B with the integrated value of the reception power of the E-DPDCH transmitted from the non-serving mobile station for the radio base station Node B.

To be more specific, the radio base station Node B determines whether or not the ratio of the integrated value of the reception power of the E-DPDCH from the serving mobile station to the integrated value of the reception power of the E-DPDCH from the non-serving mobile station (the ratio of the reception power of the serving mobile station to the reception power of the non-serving mobile station) is below the target value which is notified from the radio network controller RNC in step S1001.

When it is determined that the ratio of the integrated value of the reception power of the E-DPDCH from the serving mobile station to the integrated value of the reception power of the E-DPDCH from the non-serving mobile station is below the target value, the operation will be forwarded to step S204. In other cases, the operation will be terminated.

In step S204, the radio base station Node B calculates the relative transmission rate of the uplink user data, based on the reception power of the E-DPDCH which is calculated in the operation in FIG. 21.

In other words, in step S204, the radio base station Node B generates "DOWN Command" as the relative transmission rate of the uplink user data, and notifies "DOWN Command" via the E-RGCH.

Then, the mobile station UE controls the transmission rate of the uplink user data, based on the notified "DOWN Command" (the relative transmission rate of the uplink user data).

(Effects of Mobile Communication System According to First Embodiment of the Present Invention)

According to the mobile communication system of this embodiment, the radio base station Node B is configured to estimate the reception power of the E-DPDCH, based on the HARQ profile and the measured reception power of the DPCCH, so that it is possible to measure the reception power of the E-DPDCH easily and accurately even when patterns of the uplink user data is not revealed.

Further, according to the mobile communication system of this embodiment, the radio network controller RNC does not have to transmit the HARQ profile ID to the radio base station Node B, when the radio base station Node B stores only one HARQ profile, so that it is possible to decrease communications traffic between the radio network controller RNC and the radio base station Node B.

Furthermore, according to the mobile communication system of this embodiment, the radio network controller RNC just has to transmit the HARQ profile ID to the radio base station Node B, even when the radio base station Node B stores a plurality of HARQ profiles, so that it is possible to decrease communications traffic between the radio network controller RNC and the radio base station Node B.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling, at a mobile station, a transmission rate of uplink user data to be transmitted via an Enhanced Dedicated Physical Data Channel, comprising:
    measuring, at a radio base station, a reception power of a dedicated physical control channel transmitted from the mobile station;
    extracting, at the radio base station, a transmission data block size of the uplink user data from an Enhanced Dedicated Physical Control Channel transmitted from the mobile station;
    acquiring, at the radio base station, a transmission power ratio of the Enhanced Dedicated Physical Data Channel to the Dedicated Physical Control Channel which corresponds to the extracted transmission data block size; and
    calculating, at the radio base station, a reception power of the Enhanced Dedicated Physical Data Channel based on the measured reception power of the dedicated physical control channel and the acquired transmission power ratio,
    wherein the reception power of the Enhanced Dedicated Physical Data Channel is a subset of the total reception power including the Dedicated Physical Data Channel, Dedicated Physical Control Channel, Enhanced Dedicated Physical Data Channel and the Enhanced Dedicated Physical Control Channel;
    calculating, at the radio base station, a relative transmission rate of the uplink user data based on the calculated reception power of the Enhanced Dedicated Physical Data Channel;
    notifying, at the radio base station, the relative transmission rate of the uplink user data to the mobile station via a relative transmission rate control channel;
    controlling, at the mobile station, the transmission rate of the uplink user data based on the notified relative transmission rate of the uplink user data; and
    calculating, at the radio base station, the relative transmission rate of the uplink user data, based on the compared result of an integrated value of the reception power of the Enhanced Dedicated Physical Data Channel transmitted from a serving mobile station which sets the cell controlled by the radio base station as a serving cell and an integrated value of the reception power of the Enhanced Dedicated Physical Data Channel transmitted from a non-serving mobile station which does not set the cell controlled by the radio base station as a serving cell.

2. A radio base station used in a mobile communication system for controlling a transmission rate of uplink user data which is transmitted via an Enhanced Dedicated Physical Data Channel at a mobile station, comprising:
    a measuring unit configured to measure a reception power of a dedicated physical control channel transmitted from the mobile station;
    a transmission data block size extracting unit configured to extract a transmission data block size of the uplink user data from an Enhanced Dedicated Physical Control Channel transmitted from the mobile station;
    a transmission power ratio acquiring unit configured to acquire a transmission power ratio of the Enhanced Dedicated Physical Data Channel to the dedicated physical control channel which corresponds to the extracted transmission data block size; and
    an Enhanced Dedicated Physical Data Channel reception power calculating unit configured to calculate a reception power of the Enhanced Dedicated Physical Data Channel, based on the measured reception power of the dedicated physical control channel and the acquired transmission power ratio,
    wherein the reception power of the Enhanced Dedicated Physical Data Channel is a subset of the total reception power including the Dedicated Physical Data Channel, Dedicated Physical Control Channel, Enhanced Dedicated Physical Data Channel and the Enhanced Dedicated Physical Control Channel;
    an uplink user data relative transmission rate calculating unit configured to calculate a relative transmission rate of the uplink user data, based on the calculated reception power of the Enhanced Dedicated Physical Data Channel; and
    a relative transmission rate control channel notifying unit configured to notify the relative transmission rate of the uplink user data via a relative transmission rate control channel;
    wherein the uplink user data relative transmission rate calculating unit is configured to calculate the relative transmission rate of the uplink user data, based on the compared result of an integrated value of the reception power of the Enhanced Dedicated Physical Data Channel transmitted from a serving mobile station which sets the cell controlled by the radio base station as a serving cell and an integrated value of the reception power of the Enhanced Dedicated Physical Data Channel transmitted from a non-serving mobile station which does not set the cell controlled by the radio base station as a serving cell.

* * * * *